Sept. 20, 1927.  
F. C. LARGEN  
VARIABLE SPEED PULLEY  
Filed Oct. 25 1926
1,643,124
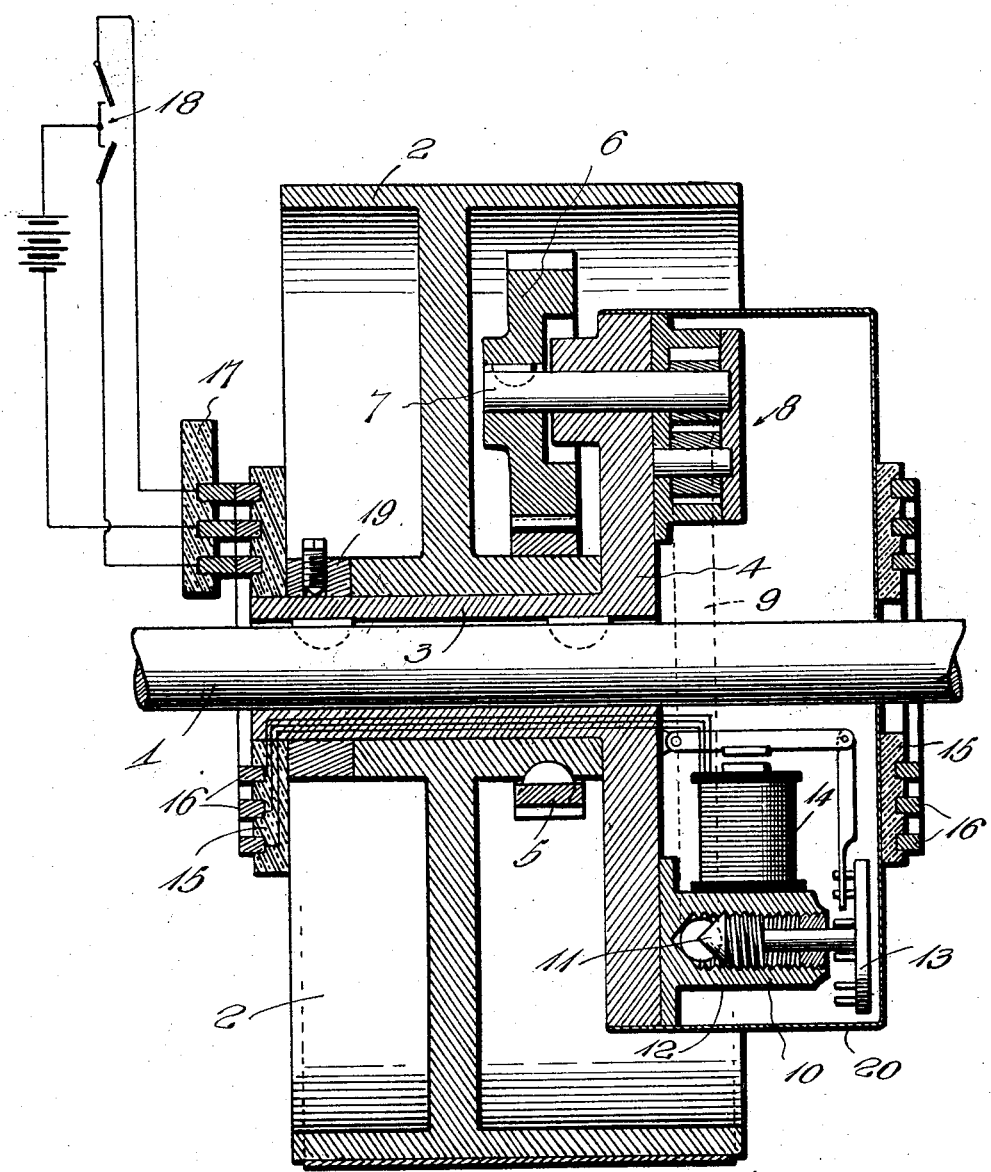
Inventor  
F. C. Largen,  
By James J. Sheehy  
Attorneys Patented Sept. 20, 1927.

1,643,124

UNITED STATES PATENT OFFICE.

FRED C. LARGEN, OF CREIGHTON, NEBRASKA.

VARIABLE-SPEED PULLEY.

Application filed October 25, 1926. Serial No. 144,091.

My present invention pertains to speed control mechanism and it contemplates the provision of a device through the medium of which the speed of a machine, particularly a blower fan can be regulated from one or more control points by the manipulation of a contact switch.

The invention further contemplates the provision of means whereby the speed of a machine may be increased and decreased by step intervals corresponding to the number of pushes given the ascending or descending control contact switch.

Other objects of the invention will be fully understood from the following description and claims when the same are read in connection with the drawing accompanying and forming part of this specification, in which:—

The figure is a view partly in section, illustrating my novel means for controlling the speed of a machine.

The shaft 1 of a driven machine is adapted to receive a pulley designated by 2 and the said pulley is mounted by set screws or spleen keys in the discretion of those practicing my invention. The primary body of the device for controlling the speed of the machine consists of a flanged hub 3 that is keyed or otherwise secured to the shaft 1. The outside of the hub is machined and forms a bearing upon which the belt pulley revolves. The member 3 is provided with the portion 4 that forms a suitable mounting for an oil pump, choke valves, operating magnets, reservoir and current controlling devices hereinafter referred to.

The pulley 2 is adapted to carry a belt and consists of a usual hub, spokes and rim upon which a driving or driven belt operates. The pulley is mounted upon the hub of the member or primary body 3 to revolve as an idler pulley.

Mounted on the pulley 2 and rigidly keyed thereon is a spur gear wheel 5 which is always in mesh with a spur gear 6 that acts as a means for imparting motion to the shaft 7 of an oil pump 8. This oil pump 8 is mounted upon the flange 4 of the member 3 and receives its motion through the spur gear 6 and shaft 7 as illustrated. The oil pump 8 is further adapted to be connected through the suction and discharge openings by means of a pipe 9 illustrated by dotted lines and the said pipe 9 connects the pump 8 with a choke valve 10 that consists of a balanced valve 11 that rotates in the casing 12. The pressure of the oil being applied to both sides of the valve permits of easy rotation while under high pressure. The stem of the choke valve is connected with a ratchet wheel 13 and the said wheel 13 in turn is connected to a pawl and lever of an electric magnet set 14 comprising sets of magnets, though I have illustrated but one. One of the pawls of the magnet set 14 operating on one side of the ratchet wheel 13 will open the choke valve while the other located on the opposite side will close the valve 10. The electromagnets 14 are connected through suitable wire to circular copper or brass collecting rings embedded in suitable insulation 15, that is mounted on the pulley so as to run true. Current is carried on through the contact brushes 16 and suitable stationary brush holders 17 to remote contact push switches 18. A thrust collar 19 is provided to hold the pulley in place and this collar also serves as a fastening for the collecting members 16.

In order to protect the pump valve and electrical equipment I provide a casing of metal or other suitable material 20. The collecting members 15 may be applied to either side of the pulley assembled.

With the oil pipes and pump filled with a medium heavy oil the choke valve is open and the pulley 2 revolves on the hub 3 as an idle pulley driving the spur gear wheel 5 which in turn revolves the gear 6 that is connected to the oil pump 8 through the shaft 7. The oil choke valve 10 being open the oil pump 8 is free to drive the oil from its suction line through the delivery line and the choke valve 10 without interruption. To bring the pulley into operation, a push on the closing button of the remote control switch 18 will bring the impulse electric magnet 14 into operation communicating motion through the armature and pawl lever to the ratchet wheel 13 closing the choke valve 10 one interval. This will retard the oil flow through the pump 8 which will cause the spur gear wheel 6 to travel slower thereby transmitting movement to the body 3 using the pump shaft 7 as a fulcrum. It will thus be seen that any amount of closing of the choke valve 10 will cause a proportionate slowing of the wheel 6 and a proportionate increase in revolution of the body 3 until there is no oil flowing through the valve 10. Consequently there will be no revolution of the pump 8 and gear 6 and hence the shaft 7 will be driving the body 3 at the same speed as the gear 5 and the pulley 2. By interval pushing upon the operating magnet 14 the valve 10 will permit flow of oil permitting pump 8 to revolve and revolution of the shaft 7 and gear 6 will permit the slowing up of the member 3 with a similar slowing up of the driven member 1 until free flowing of oil through the valve 10 permits the body 3 to stand still.

The device is extremely simple and comprises but two primary moving parts to wit, the oil pumps and idle pulley.

What I claim is:—

1. In speed control mechanism, the combination of a shaft, a body mounted on the shaft and having a flange formed thereon, an idle pulley mounted on the body, a spur gear mounted on the pulley, an oil pump secured to the flange of the body, a shaft mounted in the flange and adapted to actuate the pump, a gear mounted on the shaft and in mesh with the first named gear, a pipe connected with the pump, a choke valve communicating with the pipe, a ratchet wheel mounted on the stem of the choke valve, magnets arranged above the choke valve and having a pawl and ratchet adapted to intermittently contact the ratchet and means connected with the magnets for closing and opening the circuits to the magnets from a suitable source of electric energy.

2. In speed control mechanism, the combination of a shaft, a body mounted on the shaft, a pulley adapted to bear on the body, an oil pump mounted on the body, a shaft for actuating the pump, means for imparting motion from the pulley to the oil pump, a choke valve arranged on the body and communicating with the oil pump and electrical means interposed between the valve and pump for interrupting the flow of oil through the pump thereby affecting revolution of the body and first named shaft.

3. In speed control mechanism, the combination of a shaft, a hub mounted on the shaft and having a flange, a pulley bearing on the hub, a spur gear arranged on the hub of the pulley, a spur gear adapted to mesh with the first gear, a shaft secured to the second gear, an oil pump actuable by the shaft, a choke valve connected with the pump and means for electrically operating the choke valve to interrupt the flow of oil to the pump whereby interruption of the rotation of the pump shaft will be accomplished.

4. In speed control mechanism, the combination of a shaft, a body mounted on the shaft, an oil pump secured to the shaft, a choke valve communicating with the pump for effecting operation of said pump, a shaft arranged in the pump, a gear mounted on the shaft, a gear mounted on and actuable with respect to the first shaft and an electric magnet adapted to control operations of the choke valve and brushes and insulating means communicating with the electric control mechanism.

5. In means for controlling the speed of a machine, comprising two shafts, a body mounted on one of the shafts and a pulley loosely mounted on the body, means for imparting rotary motion from one shaft to the other and means for intermittently controlling the speed of one shaft with respect to the other and comprising an oil pump, a pipe connected with the oil pump and a choke valve communicating with the oil pump through the pipe and electrically controlled to intermittently interrupt the flow of oil through the pump.

In testimony whereof I have hereunto set my hand.

FRED C. LARGEN.